(12) United States Patent
De Jong et al.

(10) Patent No.: US 11,931,931 B2
(45) Date of Patent: Mar. 19, 2024

(54) LAMINATED FILMS AND METHODS OF MAKING AND USING SAME

(71) Applicant: CARIFLEX PTE. LTD., Singapore (SG)

(72) Inventors: Wouter De Jong, Amsterdam (NL); Philippe Henderson, Mont St. Guibert (BE); Nico Van Dijk, Amsterdam (NL)

(73) Assignee: CARIFLEX PTE. LTD., Singapore (SG)

( * ) Notice: Subject to any disclaimer, the term of this patent is extended or adjusted under 35 U.S.C. 154(b) by 215 days.

(21) Appl. No.: 17/292,851

(22) PCT Filed: Nov. 18, 2019

(86) PCT No.: PCT/US2019/061908
§ 371 (c)(1),
(2) Date: May 11, 2021

(87) PCT Pub. No.: WO2020/131267
PCT Pub. Date: Jun. 25, 2020

(65) Prior Publication Data
US 2021/0394404 A1  Dec. 23, 2021

Related U.S. Application Data

(60) Provisional application No. 62/780,373, filed on Dec. 17, 2018.

(51) Int. Cl.
| | |
|---|---|
| *B29C 41/22* | (2006.01) |
| *A41D 19/00* | (2006.01) |
| *B29C 41/00* | (2006.01) |
| *B29C 41/42* | (2006.01) |
| *C08J 5/02* | (2006.01) |
| *C08K 5/14* | (2006.01) |
| *B29K 9/06* | (2006.01) |

(52) U.S. Cl.
CPC .......... *B29C 41/22* (2013.01); *A41D 19/0055* (2013.01); *B29C 41/003* (2013.01); *B29C 41/42* (2013.01); *C08J 5/02* (2013.01); *C08K 5/14* (2013.01); *B29K 2009/06* (2013.01)

(58) Field of Classification Search
CPC .. B29C 41/14; C08K 5/14; C08K 3/06; C08L 9/08; C08L 9/10
See application file for complete search history.

(56) References Cited

U.S. PATENT DOCUMENTS

| | | | | |
|---|---|---|---|---|
| 2001/0011387 | A1* | 8/2001 | Yamashita | ................. C08J 5/02 |
| | | | | 428/313.5 |
| 2004/0071909 | A1* | 4/2004 | McGlothlin | ............ B29C 41/14 |
| | | | | 428/36.8 |
| 2008/0190322 | A1* | 8/2008 | Chen | ........................ B05D 1/18 |
| | | | | 106/218 |
| 2015/0087761 | A1 | 3/2015 | Satoh et al. | |
| 2015/0104663 | A1 | 4/2015 | De Jong et al. | |
| 2016/0263780 | A1* | 9/2016 | De Jong | .................. C08J 3/247 |
| 2019/0045863 | A1 | 2/2019 | Kitagawa et al. | |

FOREIGN PATENT DOCUMENTS

| | | |
|---|---|---|
| CN | 105764970 A | 7/2016 |
| CN | 107531979 A | 1/2018 |
| WO | 1999/065538 A1 | 12/1999 |
| WO | 2008/097643 A2 | 8/2008 |
| WO | 2010/103351 A1 | 9/2010 |
| WO | 2011/163662 A1 | 12/2011 |
| WO | 2017/146239 A1 | 8/2017 |
| WO | 2020/122704 A1 | 6/2020 |

OTHER PUBLICATIONS

Office Action for counterpart Chinese Application No. 201980082221.9, dated Jan. 12, 2023.
European Search Report for European counterpart Application No. EP 19898971.7 dated Jul. 5, 2022.
International Search Report and Written Opinion, PCT/US2019/061908, dated Jan. 28, 2020, 9 pages.

* cited by examiner

*Primary Examiner* — Robert C Boyle
(74) *Attorney, Agent, or Firm* — United One Law Group LLC; Kongsik Kim; Jhongwoo Peck

(57) ABSTRACT

An article comprises a laminate with a layer comprising a first latex composition containing a cross-linker component selected from sulfur, organic peroxide, vulcanizing activators, and vulcanizing accelerator; and a second layer comprising a second latex composition free of the cross-linker component. The laminate is formed by dipping a mold into the first latex composition then into the second latex composition forming a laminated film, then curing the laminated film by heating to a temperature between 90° C. to 140° C. Lastly, the laminated film is removed from the mold via inversion such that the second layer is inwards and the first layer is outwards.

9 Claims, No Drawings

LAMINATED FILMS AND METHODS OF MAKING AND USING SAME

FIELD

This application is a National Stage Entry of PCT/US2019/061908 filed on Nov. 18, 2019, which claims priority to U.S. Application No. 62/780,373, with a filing date of Dec. 17, 2018, and the disclosures of the aforementioned applications are incorporated herein by reference in their entireties.

FIELD

This disclosure relates to methods for making laminated articles and films comprising isoprene block copolymers.

BACKGROUND

Natural rubber latex has been applied for many years as a material for glove and condom manufacture. While the physical properties of cured natural rubber make it an excellent choice for such applications, natural rubber latex does present the risk of allergic reactions. Type I hypersensitivity may occur in response to the proteins present in the natural rubber latex.

Synthetic materials avoiding Type I skin sensitivity and allergy problems associated with natural rubber have been developed, such as synthetic polyisoprene and latexes made therefrom for use in thin film articles such as gloves and condoms. In embodiments for making articles from natural or synthetic latex, the synthetic isoprene polymer is converted into a more durable material by vulcanization, with the addition of a curing system, e.g., sulphur, an activator/accelerator system. In the process, a former in the shape of the article is dipped into a latex pre-compound with a curing system, then the latex is cured on the former.

Synthetic materials free of products such as vulcanizers/accelerators, and without the need for cross-linking, have been introduced. Some have the softness and flexibility of natural rubber but not the resistance to certain classes of chemicals for certain applications.

There is still a need for improved methods for making rubber latex articles with the requisite properties for strength, chemical resistance, and suitability for certain applications.

SUMMARY

In one aspect, a method for forming a dip-molded article is disclosed. The method comprises: providing a mold for forming the dip-molded article; dipping the mold into a first latex composition containing a vulcanizer component selected from sulfur, organic peroxide, vulcanizing activator, vulcanizing accelerator, and mixtures thereof, forming a first layer; dipping the mold having the first layer formed thereon into a second latex composition free of the vulcanizer component, forming a laminated film with a second layer formed on the first layer; curing the laminated film by heating to a temperature between 90° C. to 140° C.; removing the laminated film from the mold via inversion such that the second layer is inwards and the first layer is outwards.

In some embodiments, first latex composition and the second latex composition are prepared from the same synthetic isoprene block copolymer. In other embodiments, the first latex composition and the second latex composition are based on different polymers, and the first latex composition contains one of: a synthetic polyisoprene polymer latex, a nitrile-based copolymer latex, a synthetic isoprene polymer grafted with a monomer having a carboxyl group, a natural rubber latex, a polychloroprene latex, a carboxylated acrylonitrile butadiene latex, a polyurethane latex, or a styrene-butadiene latex.

DESCRIPTION

The following terms will be used throughout the specification and will have the following meanings unless otherwise indicated.

"Molecular weight" (or MW) in the context of copolymers, refers to the true molecular weight in g/mol of the polymer or block of the copolymer, which can be measured with gel permeation chromatography (GPC) using polystyrene calibration standards according to ASTM 5296-11, with values representing the molecular weight at the peak of the distribution. The calibrated MW are styrene equivalent MW, also referred to as apparent MW. The styrene equivalent molecular weight may be converted to true molecular weight when the styrene content of the polymer and the vinyl content of the diene segments are known.

"Coupling efficiency" is defined as the number of molecules of coupled polymer divided by the number of molecules of coupled polymer plus the number of molecules of uncoupled polymer. Coupling efficiency can be determined theoretically from the stoichiometric quantity of coupling agent required for complete coupling, or coupling efficiency can be determined by an analytical method such as GPC. For example, if a coupling efficiency of a block copolymer is 80%, then the copolymer will contain 20% diblock and 80% triblock and multiarm block.

In embodiments, laminated articles with superior physical properties are made with layers formed from latices of different compositions, one with and one without a cross-linking system with components such as sulfur, organic peroxide, activators, and the like. After curing, the article is inverted such that the layer free of the vulcanizing system is inwards, e.g., for contact with a sensitive skin, and the layer with a vulcanizing system is outwards.

Synthetic Isoprene Block Copolymers: The first step in the synthesis of isoprene block copolymers involves contacting an alkenyl arene with an initiator, typically an organolithium compound, in the presence of an inert diluent thereby forming a living polymer compound having the simplified structure A-Li. A is therefore composed for at least 90 mol % of an alkenyl arene. The alkenyl arene is preferably styrene. Other useful alkenyl arenes from which the A blocks may be formed include alphamethyl styrene, tertbutyl styrene, vinyl piperidine and other ring alkylated styrenes as well as mixtures of the same. Minor amounts of other anionically copolymerizable monomers may be included. Next, the living polymer in solution is contacted with a isoprene, forming a polymer block B. Other copolymerizable monomers may be included. B is composed for at least 90 mol % of isoprene. The resulting living polymer has a simplified structure A-B-Li. It is at this point that the living polymer may be coupled by addition of a multi-functional coupling agent or a second amount of an alkenyl arene is added to form linear block copolymer A-B-A.

In one embodiment, the block copolymers comprise at least two blocks (A) of polymerized mono alkenyl arene and at least one block (B) of polymerized conjugated diene, with the blocks being arranged in a linear fashion or in a radial fashion, as A-B-A or A-B-Y-(B-A)$_n$, where Y represents the residue of a coupling agent and n+1 represents the average number of arms in the radial structure. In embodiments, the coupling efficiency is greater than 90%, and alternatively from 92% to 100%. Typical coupling agents include but are not limited to polyepoxides, polyisocyanates, polyimines, polyaldehydes, polyketones, polyanhydrides, polyesters, polyhalides, and compounds containing two or more functional groups such as epoxy and aldehyde groups, isocyanate and halide groups, and the like. In an aspect, the coupling agent is γ-glycidoxy-propyl-trimethoxy-silane (GPTS).

In some embodiments, the diblock arms couple together, forming a triblock copolymer when (n+1) equals 2 (meaning 2 arms of diblock are coupled together) or a radial type polymer when (n+1) is greater than 2.

The A block is formed by polymerization of mono-alkenyl arene monomers. The mono-alkenyl arene may be styrene, α-methylstyrene, methylstyrenes other than α-methylstyrene, vinyl toluene, para-butylstyrene, ethylstyrene and vinylnapthalene, and these can be used alone or in combination of two or more. In an aspect, the mono-alkenyl arene is styrene.

The B block is a polymer block of a conjugated diene and has rubbery character. The conjugated diene may be 1,3-butadiene, substituted butadiene such as isoprene, piperylene, 2,3-dimethyl-1,3-butadiene, myrcene, and 1-phenyl-1,3-butadiene or mixtures thereof. In an aspect, B is isoprene.

In embodiments of a radial structure A-B, living diblock arms are first formed by sequential, anionic polymerization and then coupled using a coupling agent having a functionality of 3 or greater. In the radial block copolymer structure, the A blocks have average molecular weights between 10,000 g/mol and 12,000 g/mol. The B blocks have average molecular weights between 75,000 g/mol and 150,000 g/mol, alternatively between 80,000 g/mol and 120,000 g/mol. The weight percentage of the A blocks in the finished block polymer is between 8% and 15%, alternatively between 10% and 12% by weight.

When the block copolymer is a linear polymer, the A-B-A structure can be formed by linear sequential polymerization or by coupling living A-B arms. In these linear block copolymers, each A block has a molecular weight of from 8,000 g/mol to 15,000 g/mol, alternatively from 9,000 g/mol to 14,000 g/mol. The total molecular weight of the block copolymer ranges from 150,000 g/mol to 250,000 g/mol, alternatively from 170,000 g/mol to 220,000 g/mol. The block copolymer has a monoalkenyl arene content of from 8 wt. % to 15 wt. %, alternatively 9 wt. % to 14 wt. %, based on the total weight of the block copolymer.

In one embodiment for use with a layer free of vulcanizer, the copolymer is a SIS (styrene-isoprene-styrene) block copolymer containing 18% styrene and 82% isoprene and having a weight average molecular weight of about 130,000 Daltons. In another embodiment for use in a layer free of vulcanizer, the copolymer has the formula A-B-Ym-(B-A)n, with A, B, Y, n as defined above, and with A having a weight average molecular weight of 8,000 to about 15,000 Daltons, B having a weight average molecular weight from about 30,000 to about 200,000 Daltons, m is 0 or 1, and n is an integer from 1 to 5.

In yet another embodiment for use with a layer free of vulcanizer, the copolymer is a mixture comprising from 60 wt % to 10 wt % of a radial styrenic block copolymer and from 40 wt % to 90 wt % of a styrene diene diblock copolymer. The styrene diene diblock copolymer is a styrene isoprene diblock copolymer and/or a styrene butadiene diblock copolymer. When the diblock copolymer is a styrene butadiene diblock copolymer it has a styrene content of 10 wt % to 30 wt %.

The synthetic isoprene polymer in embodiments is characterized as having a Mooney viscosity [$MI_{1+4}$, 100° C.] of 50 to 80, or 60 to 80, or 70 to 80.

The synthetic isoprene polymers may be prepared by any suitable methodology, e.g., using anionic polymerization processes with an organolithium compound as initiator in an inert solvent, by polymerization with a ZieglerNatta coordination type catalyst like titanium or neodymium or by emulsion polymerization or suspension polymerization ofisoprene, to directly produce a synthetic polyisoprene latex. The synthetic isoprene polymer is optionally copolymerized with an ethylenically unsaturated monomer.

Latex: In embodiments if the polymer is not directly produced in a final form of a latex, a latex emulsion is formed by emulsifying a solution or fine suspension of the synthetic polymers dissolved or finely dispersed in an organic solvent, in the presence of a surfactant in water and, removing the organic solvent as needed, and thereby producing a synthetic polymer latex.

The latex emulsion is characterized by a solids content of from 20 weight percent (wt. %) to 80 wt. %, alternatively of from 30 wt. % to 70 wt. % or alternatively from 35 wt. % to 65 wt. %; a surfactant content of 0.5 to 50 parts by weight with respect to 100 parts by weight of the synthetic polyisoprene; and the water content is 50 to 5,000 parts by weight with respect to 100 parts by weight of the synthetic polymer. Anionic, cationic or non-ionic surfactants or combinations thereof may be used as the surfactant.

The latex emulsion may further comprise additives such as antioxidants, e.g., primary antioxidants, secondary antioxidants, and carbon radical scavengers. Other additives may include a pH adjuster, defoamer, preservative, cross-linking agent, chelating agent, oxygen scavenger, dispersant, oils, co-solvents, waxes, colorants, tackifiers, fillers, release agents, anti-blocking agents, and other additives. As the pH adjuster, for example, sodium hydroxide, potassium hydroxide, and other hydroxides of alkali metals; sodium carbonate, potassium carbonate, and other carbonates of alkali metals; sodium hydrogen carbonate, and other hydrogen carbonates of alkali metals; ammonia; trimethylammonium, triethanolamine, and other organic amine compounds; etc. Primary antioxidants can be added in amounts from 0.3 wt. % to 1.5 wt. % or alternatively from 0.5 wt. % to 1 wt. % based on the total weight of the latex emulsion. Secondary antioxidants may also be used along with the primary antioxidants, in amounts ranging from 0.5 wt. % to 2.5 wt. % or alternatively from 0.5 wt. % to 2 wt. %.

In some embodiments and depending on the layer, the latex does not contain any any cross-linking additives (e.g., vulcanizer or accelerator), and in other embodiments for use in a particular layer, the latex contains a cross-linking additive.

In embodiments, the latex is characterized as having a volume average particle size of 0.5 to 10 μm, or 0.5 to 3 μm, or 0.5 to 2 μm.

Sulfur-based Cross-linker (Vulcanizer): In embodiments where the latex is cured with a vulcanizing cross-linker, the latex emulsion is cured with sulfur which can be in many forms, e.g., powdered sulfur, flower of sulfur, precipitated sulfur, colloidal sulfur, surface-treated sulfur, insoluble sulfur, and other sulfurs; sulfur chloride, sulfur dichloride, morpholine disulfide, alkylphenol disulfide, N, N'-di thio-bis (hexahydro-2H-azenopine-2), phosphorus-containing polysulfide, high molecular weight polysulfide, 2-(4'-morpholinodithio)benzothiazole, and other sulfur-containing compounds. These sulfur-based vulcanizers may be used as single types alone or as two types or more together.

The amount of sulfur ranges from 0.05 to 10 parts by weight with respect to 100 parts by weight of the synthetic polymer, or from 0.1 to 3 parts by weight, or from 0.2 wt. % to 0.5 wt. % based on the total weight of the latex emulsion.

Peroxide-based Cross-linker: In embodiments, curing of the latex emulsions can be carried out using organic peroxides and conditions commonly used in the curing of natural and synthetic polydiene rubbers. The organic peroxides can be added to the latex emulsion to create cross-links between the unsaturated bonds in the rubber chains of the B blocks. In one embodiment, the organic peroxides are added to the latex emulsion in the form of aqueous dispersions. The peroxide level in the reaction is given in terms of the active oxygen in parts per million (ppm), in amounts ranging from 20 ppm to 80 ppm, alternatively from 20 ppm to 60 ppm, and further alternatively from 30 ppm to 60 ppm.

Examples of organic peroxides include without limitation hydroperoxide, dialkyl peroxide, diacyl peroxide, peroxyketal, ketone peroxide, peroxyketal diacyl peroxides, peroxydicarbonates, monoperoxycarbonates, peroxyesters, dialkyl benzoyl peroxide, lauroyl peroxide, t-butyl peroxybenzoate, 1,1-di-t-butylperoxy-2,4-di-t-butylcyclohexane, succinic acid peroxide, benzoyl peroxide, t-butyl peroxy-2-ethyl hexanoate, p-chlorobenzoyl peroxide, t-butyl peroxy isobutylate, t-butyl peroxy isopropyl carbonate, t-butyl peroxy laurate, 2,5-dimethyl-2,5-di(benzoyl peroxy)hexane, t-butyl peroxy acetate, di-t-butyl diperoxy phthalate, t-butyl peroxy maleic acid, cyclohexanone peroxide, t-butyl peroxy benzoate, dicumyl peroxide, 2,5-dimethyl-2,5-di(t-butylperoxy)hexane, t-butyl cumyl peroxide, t-butyl hydroperoxide, di-t-butyl peroxide, 2,5-dimethyl-2,5-di(t-butylperoxy) hexyne-3, α,α'-bis-t-butylperoxy-1,4-diisopropylbenzene or combinations thereof.

In one embodiment, the peroxide cross-linker formulation includes at least one peroxide and at least one compound having a secondary amine group selected from amino acids, such as arginine, folic acid, and polyethyleneamines, as disclosed in US20170355785A1, incorporated herein by reference.

Vulcanization Accelerator: In embodiments where the latex is used with a vulcanizer, e.g., sulfur, a vulcanization (or vulcanizing) accelerator can be used in an amount from 0.05 to 5 parts by weight with respect to 100 parts by weight of the synthetic polymer, more preferably 0.1 to 2 parts by weight. Examples include diethyldithiocarbamic acid, di butyldithiocarbamic acid, di-2-ethylhexyldithiocarbamic acid, dicyclohexyldithiocarbamic acid, diphenyldithiocarbamic acid, dibenzyldithiocarbamic acid, and other dithiocarbamic acids and their zinc salts; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio carbarylthio)benzothiazole, 2-(2, 6-dimethyl-4-morpholinothio)benzothiazole, 2-(4'-morpholino dithio)benzothiazole, 4-morpholinyl-2-benzothiazyl disulfide, and 1,3-bis (2-benzothiazyl mercaptomethyl) urea.

In some embodiments, the accelerator is selected from compositions with reduced allergenic potential, e.g., fugitive xanthate accelerators selected from diisopropyl xanthogen polysulfide, dibutyl xanthogen disulfide, and diisopropyl xanthogen disulfide as disclosed in US9,550,906B2, incorporated herein by reference.

Vulcanizing Activator: In some embodiments depending on the vulcanizer, a vulcanizing activator may be employed. The activator may also serve as an accelerator. Examples of activators include but not limited to zinc oxide, lead monoxide, zinc salts and combinations thereof.

Methods for Forming Articles: To prepare a thin walled rubber article, layers are formed from the latex prepared from the polymer(s), with at least a layer with a cross-linking component (e.g., sulfur, peroxide, accelerator, activator, etc.), and at least one layer is free from a cross-linking system. The various layers can be prepared from the same or different polymer latex compositions, forming a laminated film.

A thin walled rubber article, or a film, refers to all forms whether made by coating and evaporation, or by of dipping. In one aspect, the latex film is formed via "coalescence," with the compaction, deformation, cohesion and polymer chain inter-diffusion of the individual latex particles which are normally held apart by stabilizing forces such as electrostatic, and/or steric resulting from the charged polymer chain end groups or adsorbed surfactant and polymer. These forces and others resisting particle deformation can be overcome upon evaporation of the continuous phase—or the water present in the emulsion. The formation of a continuous film, e.g., transparent and crack-free, depends on the minimum film formation temperature (MFFT) of the polymer, as judged visually on a bar having a temperature gradient, which in turn is dependent on the elastic modulus of the film-forming material, the resistance to particle deformation, and to a lesser extent, the viscosity of the polymer.

In the process, a suitable surface is coated with the latex containing a cross-linker and/or accelerator system forming a first layer, then an additional layer free of cross-linker (and/or accelerator) is formed or laminated thereon. The resulting film is dried and cross-linked with temperatures for drying and curing varying from 25 to 130° C. Depending on the application, if the formed article is for contact with sensitive skin, the article is inverted such that the layer formed from a latex free of cross-linker (and/or accelerator) is inside, and the other layer (prepared from a latex with a cross-linker and/or accelerator) is for the outside.

In one example for making a thin walled article, a mold (former) is first dipped into a latex free of cross-linker (and/or accelerator). The dip-coated mold is then removed from the latex and (air) dried. The mold may be dip coated more than once in the same latex before dip coated with a different latex (containing a cross-linker and/or accelerator). After the mold is dip-coated in a first latex and dried, it is dip-coated in a second latex containing a cross-linker system, dried, and so forth. The mold can be dip coated more than once in the latex containing a cross-linker.

In some embodiments, before dipping the mold into a dip-forming latex composition or after pulling up the mold from the dip-forming latex, it is possible to use a coagulating agent. Examples of coagulant includes barium chloride, calcium chloride, magnesium chloride, zinc chloride, aluminum chloride, or other metal halides; barium nitrate, calcium nitrate, zinc nitrate, or other nitrates; barium acetate, calcium acetate, zinc acetate, or other acetates; calcium sulfate, magnesium sulfate, aluminum sulfate, or other sulfates; or other water-soluble polyvalent metal salts, and mixtures. In one example, the mold is dipped in a dispersion of a coagulant, the coagulant on the surface of the mold is dried, and subsequently, the mold is dipped into the rubber latex.

After the various layers are formed, a film (or article) with laminated layers can be formed and then cured by heating the film to a temperature from 90° C. to less than 130° C., or from 110° C. to 125° C. In one example, the curing is for 10-40 minutes at 110 to 140° C.

In one embodiment for a method with a latex composition employing organic peroxide as a curing system, the latex film comprises (i) a first layer of conjugated diene containing polymer, an organic peroxide and optionally sulphur and (ii) a second layer comprising a styrenic block copolymer that does not contain the organic peroxide. The Sulphur added to the first peroxide containing latex acts as oxygen scavenger. The first layer prepared from the conjugated diene containing polymer latex cured in this manner is excluded from dissolved and atmospheric oxygen thus providing strong, elastic films.

As disclosed herein, the method and latex composition is for use with synthetic isoprene polymers, but other compositions can be employed, e.g., nitrile-based copolymer latex, a synthetic isoprene polymer grafted with a monomer having a carboxyl group for improved properties, natural rubber latexes, polychloroprene, carboxylated acrylonitrile butadiene, polyurethane, styrene-butadiene, and the like, etc. Additionally, the latex layer in contact with the skin can contain additives suitable for certain applications, e.g., cannabis or cannabis derived compositions for increased skin sensation, etc. In other embodiments, the latex layer in contact with the skin (or the outer layer) can contain additives for a visually noticeable color change upon a breach or contamination event. In some embodiment, after inversion of the layers, the formed article may undergo additional steps, e.g., coating, for additional strength/protection/donning, or coating with antimicrobial agent(s) for anti-blocking properties.

Applications: The article as formed is characterized as having excellent adhesion between the different layers, showing little if any delamination, and can be used as films, balloons, surgical gloves, examination gloves, electrical insulation gloves, industrial gloves or condoms. For applications in contact with sensitive skin, the layer formed from a latex free of vulcanizer (and/or accelerator) is in contact with the skin, and the other layer (prepared from a latex with a vulcanizer) is for the outside, e.g., with properties for chemical resistance and the like.

EXAMPLES

The Following Illustrative Example is Intended to be Non-Limiting

A latex was made using Polymer 1, which is a radial block copolymer with A blocks composed of polymerized styrene monomer and B blocks comprised of polymerized isoprene monomer. The molecular weight of the A blocks is 11,800, the molecular weight of the B blocks is 96,000, the coupling agent is γ-glycidoxy-propyl-trimethoxy-silane (GPTS), and the average number of arms (n) was 2.7.

The latex was diluted to 30-35% solids and 0.3 phr Manawet 172 surfactant was added. The pH was increased to 11 by the addition of a 10% KOH solution. The organic peroxide dispersion was added to the latex and the mixture was stirred for at least 24 hours.

To obtain thin-walled dipped goods metal plates (12×4.5 cm) were used. The formers were heated in an oven at 100° C. and then dipped for 30 seconds in a coagulant solution. The formers were dried in the same 100° C. oven for at least 90 seconds and then dipped into the compounded latex dispersion for (20 to 30 seconds). Immediately after dipping, the wet latex films were solidified at 100° C. for 48 seconds, followed by a leaching step in a water bath at 50° C. for 5 minutes. The films were cured at 120° C. for 20 minutes. The films were dusted with silica powder and removed from the formers.

The swell of the material was measured by cutting a circular piece of the film with a diameter of 15 mm. This was placed in toluene in a petri-disc and after 1 hour the diameter of the swollen film was measured.

Example 1

The latex containing Polymer 1 was compounded with 0.5 phr Perkadox L-W40, an aqueous dispersion of dibenzylperoxide, and 0.25 phr sulfur dispersion.

Example 2

The latex containing Polymer 1 was compounded with 1 phr Perkadox L-W40, an aqueous dispersion of dibenzylperoxide, and 0.5 phr sulfur dispersion.

Comparative Laminated Structure 1: The latex containing Polymer 1 was compounded with 0.5 phr Perkadox L-W40, an aqueous dispersion of dibenzylperoxide, no sulfur dispersion was added.

Comparative Laminated Structure 2: The latex containing Polymer 1 was compounded with 1 phr Perkadox L-W40, an aqueous dispersion of dibenzoylperoxide, no sulfur dispersion was added. The oven was purged with nitrogen to remove atmospheric oxygen.

TABLE 1

|  | Example 1 | Example 2 | Example 3 | Comparative 1 | Comparative 2 |
| --- | --- | --- | --- | --- | --- |
| Swell (mm) | 35 | 32 | — | No | No |
| Degradation | No | No | — | severe | No |

Example 3

A glove is prepared with a first layer containing a first latex containing a vulcanization system with sulfur and accelerators as disclosed in U.S. Pat. No. 8,673,172 ("Old Latex"), and a second layer containing a second latex free of cross-linking materials with accelerators is prepared as disclosed in US20150104663 ("New Latex"). The accelerator-free New Latex is laminated onto the Old Latex layer according to the method: 1. Coagulant drip; 2. Dry; 3) Old Latex compound dip; 4) Dry 1 minute at 100° C.; 5) Accelerator-free New Latex dip; 6) Dry 1 minute at 100° C.; 7) Leach 50° C. 5 minutes; 8) Cure 25 minutes at 130° C.

After the dipping process and temperature treatment, the glove is inverted and the New Latex layer is inside, in contact with the skin. The formed article has the following properties. It is noted that the finished product has minimal ballooning with no delamination even under stress.

|  | Thickness (μm) | Tensile strength (MPa) |
| --- | --- | --- |
| New Latex | 80 | 18.2 |
| Old Latex | 160 | 24.5 |
| Combined Laminate | 204 | 24.4 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for forming a dip-molded article comprising:
   providing a mold for forming the dip-molded article;
   dipping the mold into a first latex composition containing a cross-linker component selected from sulfur, organic peroxide, vulcanizing activator, vulcanizing accelerator, and mixtures thereof, forming a first layer;
   dipping the mold having the first layer formed thereon into a second latex composition free of the cross-linker component, forming a laminated film with a second layer formed on the first layer;
   curing the laminated film by heating to a temperature between 90° C. to 140° C.; and
   removing the laminated film from the mold via inversion such that the second layer is inwards and the first layer is outwards,
   wherein the first latex composition and the second latex composition are prepared from a same synthetic isoprene block copolymer, and
   wherein the synthetic isoprene block copolymer has a general formula A-B-Y-(B-A)$_n$, wherein (n+1) represents an average number of arms in a coupled polymer and n ranges from 1 to 6 and Y represents a residue of a coupling agent, A is formed by polymerization of mono-alkenyl arene monomers selected from the group consisting of styrene, α-methylstyrene, methylstyrenes other than α-methylstyrene, vinyl toluene, para-butylstyrene, ethylstyrene and vinylnapthalene, and B is a polymer block of a conjugated diene selected from the group consisting of 1,3-butadiene, substituted butadiene and mixtures thereof.

2. The method of claim 1, wherein the first latex composition comprises sulfur and organic peroxide.

3. The method of claim 1, wherein the organic peroxide is selected from the group consisting of a hydroperoxide, a dialkyl peroxide, a peroxy ester, a diaryl peroxide, a diacyl peroxide, a ketone peroxide, a peroxy dicarbonate, and a peroxyketal.

4. The method of claim 1, wherein the mono-alkenyl arene is styrene and the conjugated diene is isoprene.

5. The method of claim 1, wherein the coupling agent is γ-glycidoxy-propyl-trimethoxy-silane.

6. The method of claim 1, wherein the pH of the second latex composition is 10 or greater.

7. An article prepared by the method of claim 1, wherein the article is a film, balloon, surgical glove, examination glove, electrical insulation glove, industrial glove or condom.

8. A laminated article comprising at least two layers:
   a first layer comprising a first latex composition containing at least a cross-linker component selected from sulfur, organic peroxide, vulcanizing activators, and vulcanizing accelerator;
   a second layer comprising a second latex composition free of the cross-linker component;
   wherein laminated article is formed by:
      dipping a mold having a form of the laminated article into the first latex composition, forming the first layer;
      dipping the mold having the first layer formed thereon into the second latex composition, forming a laminated article with the second layer on the first layer;
      curing the laminated article by heating to a temperature between 90° C. to 140° C.; and
      inverting the laminated article such that the second layer is inwards and the first layer is outwards,
   wherein the first latex composition and the second latex composition are prepared from a same synthetic isoprene block copolymer, and
   wherein the synthetic isoprene block copolymer has a general formula A-B—Y-(B-A)$_n$, wherein (n+1) represents an average number of arms in a coupled polymer and n ranges from 1 to 6 and Y represents a residue of a coupling agent, A is formed by polymerization of mono-alkenyl arene monomers selected from the group consisting of styrene, α-methylstyrene, methylstyrenes other than α-methylstyrene, vinyl toluene, para-butylstyrene, ethylstyrene and vinylnapthalene, and B is a polymer block of a conjugated diene selected from the group consisting of 1,3-butadiene, substituted butadiene and mixtures thereof.

9. The laminated article of claim 8, wherein the first latex composition contains sulfur or organic peroxide as a cross-linker.

\* \* \* \* \*